United States Patent [19]

Wetherall et al.

[11] 4,143,899

[45] Mar. 13, 1979

[54] GATHERING IMPLEMENT

[75] Inventors: Henry E. Wetherall; Edith K. Mount Hill, both of Weybridge, England

[73] Assignee: Q. V. Sales Limited, Sevenoaks, England

[21] Appl. No.: 851,798

[22] Filed: Nov. 15, 1977

[51] Int. Cl.² .............................................. A01K 29/00
[52] U.S. Cl. .................................. 294/50.9; 294/19 R
[58] Field of Search ................... 294/50.9, 50.5, 50.6, 294/19 R; 56/400.12, 400.04, 400.07, 400.11, 400.17, 400.18, 408.20; 15/257.4, 257.6, 257.7

[56] References Cited

U.S. PATENT DOCUMENTS

| | | | |
|---|---|---|---|
| 1,939,475 | 12/1933 | Walsh | 294/50.9 |
| 2,792,697 | 5/1957 | Gingold | 15/257.6 |
| 3,264,809 | 8/1966 | Jackson | 56/400.12 |
| 3,601,966 | 8/1971 | Kerry | 56/400.12 |

*Primary Examiner*—James B. Marbert
*Attorney, Agent, or Firm*—William R. Liberman

[57] ABSTRACT

An implement for gathering objects lying on the ground having an elongate handle. A transverse member is mounted at a forward end of the handle. This member has a rearward surface extending at an oblique angle to the axis of the handle. A movable member is pivotally mounted at or adjacent the forward end of the handle for movement between an inactive position and an active position. In the active position it cooperates with the rearward surface of the transverse member for picking up objects from the ground. The movable member is biassed towards its inactive position by spring means.

7 Claims, 3 Drawing Figures

U.S. Patent　Mar. 13, 1979　Sheet 1 of 2　4,143,899

GATHERING IMPLEMENT

BACKGROUND TO THE INVENTION

An annual chore for a gardener is the gathering up of dead leaves in the autumn and early winter. Most gardeners resort to the use of a rake to gather the leaves into convenient piles which can then be transferred to a wheel barrow with the aid of a pair of boards held one in each hand.

This job is tedious and time consuming and necessitates fairly frequent changes of implement (i.e. from rake to boards and vice-versa) and is particularly difficult where the leaves have fallen in long grass.

An object of the present invention seeks to provide an implement for gathering from the ground objects lying thereon such as dead leaves or similar light garden debris, whereby raking and lifting of the gathered leaves can be achieved with one and the same implement.

BRIEF SUMMARY OF THE INVENTION

An implement for gathering objects lying on the ground comprising an elongate handle, a transverse member mounted at a forward end of the handle and having a rearward surface extending at an oblique angle to the axis of the handle, a movable member pivotally mounted at or adjacent the forward end of the handle for movement between an inactive position and an active position in which it cooperates with the rearward surface for picking up objects from the ground, spring means biasing the movable member towards its inactive position, and means for moving the movable member from its inactive to its active position.

Throughout this specification and claims words such as "forward" and "rearward" refer to the relative positions of the various portions of the implement when in use for raking leaves or similar light garden debris.

BRIEF DESCRIPTION OF THE ACCOMPANYING DRAWINGS

DESCRIPTION OF PREFERRED EMBODIMENTS

Figure 1:
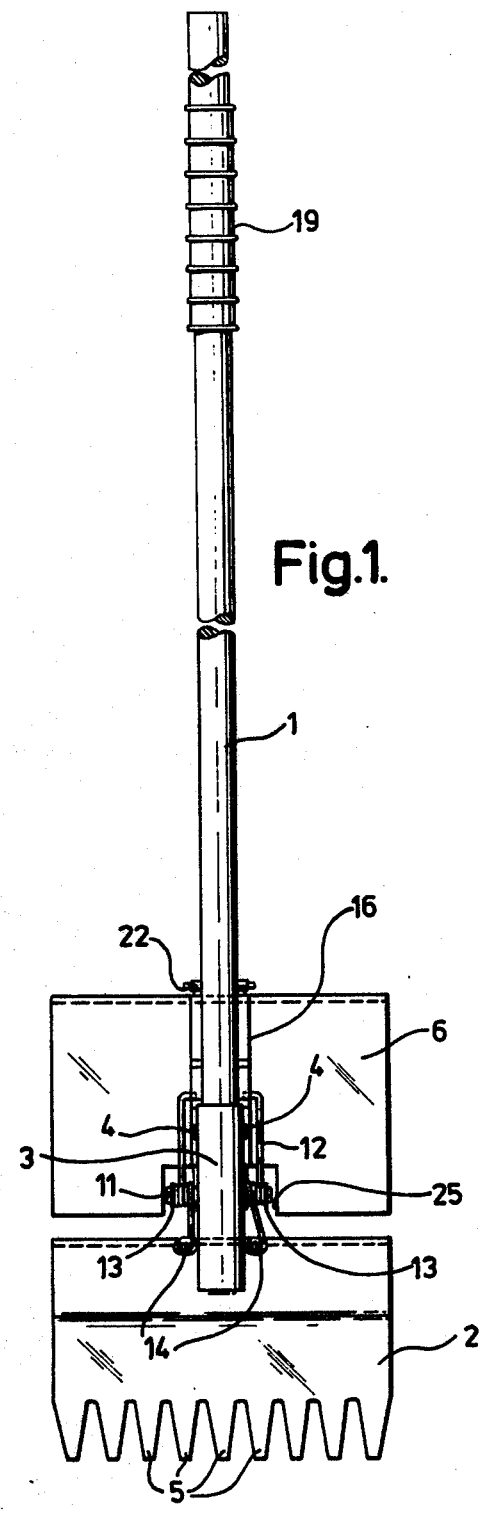
FIG. 1 is a top plan view of an implement according to the invention.

An implement for gathering dead leaves of similar light garden debris comprises an elongate handle 1 having fixed at its forward end a transverse member 2. Member 2 is integrally formed with a socket portion 3 adapted to receive the forward end of the handle 1 and is secured to the handle 1 by means of nails 4 or other suitable means (e.g. pins or screws). As can be seen from FIGS. 2 and 3 member 2 is of L-section with the socket portion 3 projecting from the shorter arm or "foot" of the L-section at an oblique angle so that the rear face of the longer arm or "upright" of the L-section is also at an oblique angle to the handle. As its free edge member 2 is formed with a number of serrations or teeth 5.

A movable member 6, also of L-section is pivotally mounted to a link member 7 about a pivot pin 8. As is seen best from FIG. 3 link member 7 consists of a pair of arms 9 arranged one on each side of socket portion 3 joined at their free ends by means of a yoke 10.

Link member 7 is itself pivotally mounted to the implement at the forward end of handle 1 by means of a pivot pin 11 passing through the socket portion 3.

A spring 12 of the mouse trap type is mounted so that the pivot pin 11 passes through the coiled portion of the spring 12. Reference numeral 13 indicates retaining washers for locating the coil portions of the spring 12 on pivot pin 11. One end of spring 12 bears on transverse member 2 and is secured thereto by means of bolts 14. The other end of spring 12 is arranged to bear against the movable member 6 and is slidable within a slot 15 defined between movable member 6 and a strap member 16 secured thereto by means of bolts 17, 18.

Toward the rearward end of the handle the implement is provided with a sleeve 19 which is slidable longitudinally of the handle 1. Sleeve 19 is connected to movable member 6 by means of a swinging link arm 20 which is pivoted at 21 to sleeve 19 and at 22 to movable member 6.

Figure 2:
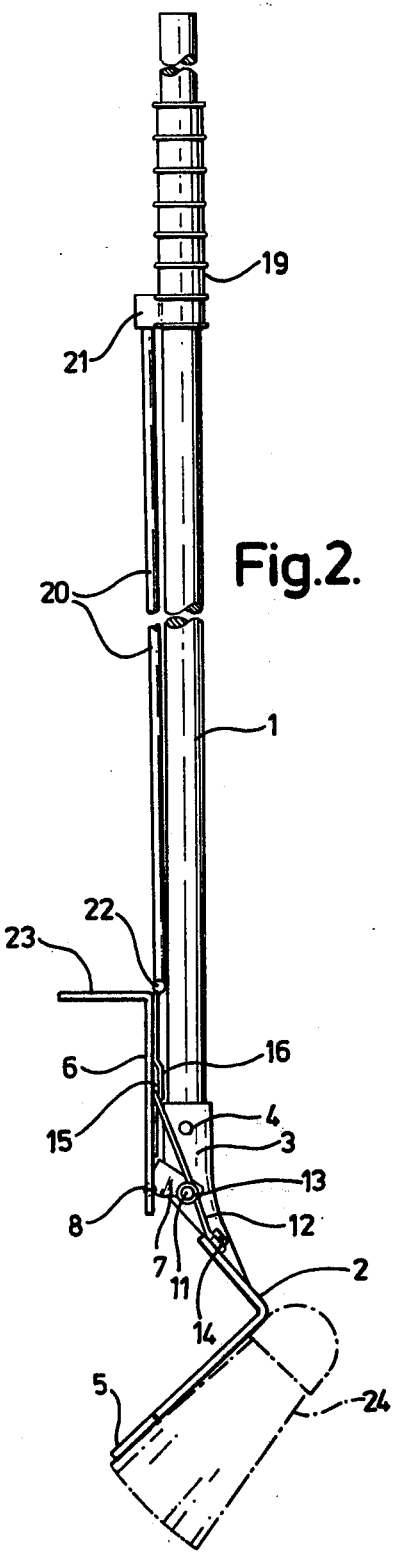
FIG. 2 is a side view of the implement of FIG. 3.
Figure 3:
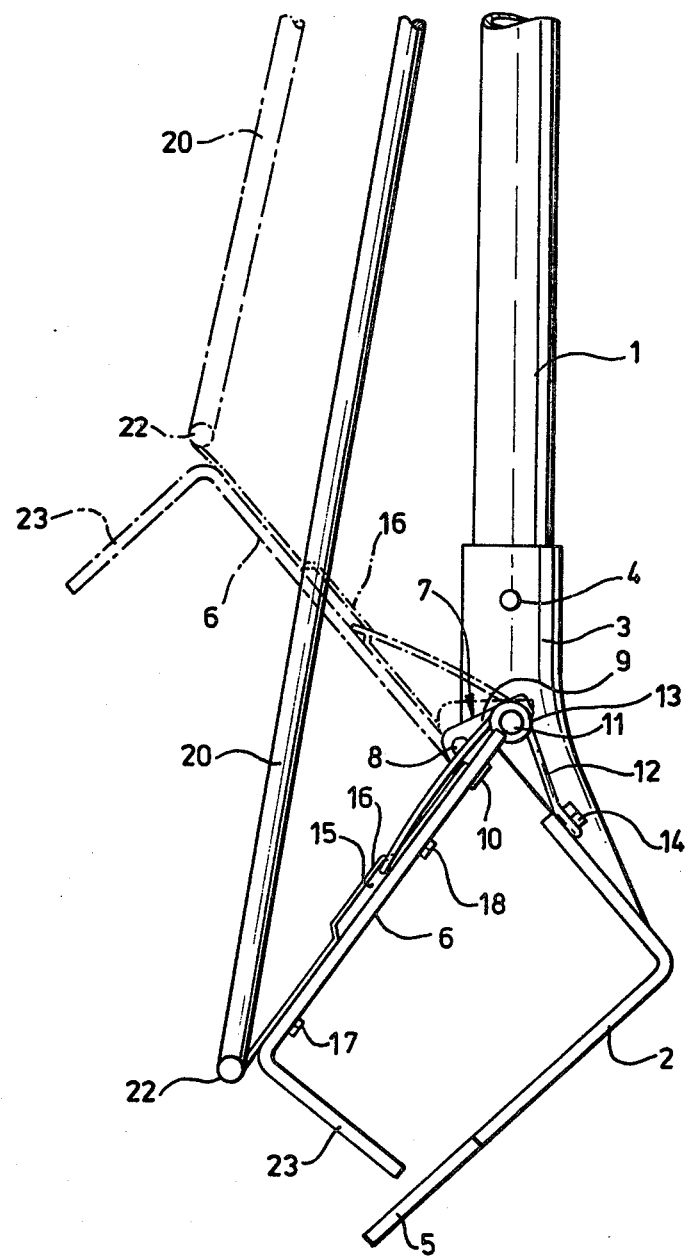
FIG. 3 is a side view to an enlarged scale of part of the implement of FIGS. 1 and 2 illustrating the method of operation.

Spring 12 is arranged to bias movable member 6 towards its inactive position (as shown in FIGS. 1 and 2) in which the shorter part or "foot" 23 of the movable member 6 projects substantially at right angles to the handle 1.

In use of the implement with the movable member in the position shown in FIGS. 1 and 2, the implement can be used as a rake, e.g. for raking up dead leaves or similar light garden debris. When a sufficient pile of leaves or other debris has been assembled the sleeve 19 is pushed towards the forward end of the handle 1 with one hand whilst the rearward end of the handle is retained in the other hand. In this way the movable member 6 is caused to pivot against the action of the spring 12 about the pivot pin 8 until an intermediate position is reached (as shown in dot-dash lines in FIG. 3). Upon further forward movement of the sleeve 19 the link member 7 itself pivots about pivot pin 11 to the position shown in full lines in FIG. 3. Further forward movement of sleeve 19 thereafter causes movable member 6 to move to the position shown in full lines in FIG. 3. In this way a bundle of dead leaves or similar light garden debris can be compressed somewhat and held between the movable member 6 and the rearward face of transverse member 2 for lifting from the ground to a wheel barrow or similar receptacle. In this way gathering of leaves or similar light garden debris can be achieved with one and the same implement, thus speeding up the operation compared with the use of a rake of similar size and boards.

When the bundle of gathered and lifted leaves or debris is appropriately positioned above the wheel barrow or other receptacle movement of the sleeve 19 toward the rearward end of the handle 1 allows the movable member 6 to return to its inactive position under the influence of spring 12 and release its load.

The handle 1 may be made of wood, plastics or metal and may be a unitary handle or may consist of two or more handle portions formed at their ends with male and female threads, the handle portions being assembled end to end and screw threadedly engaged one with another.

Transverse member 2 and movable member 6 may be made, for example, of plastics material. Alternatively they may be made of metal. Socket portion 3 can be made integral with transverse member 2 (as illustrated) or may form a separate integer secured to transverse member 2, such separate integer comprising a circular metal collar extending to a flattened section by means of which it is bolted or rivetted to the transverse member 2. In an alternative embodiment not illustrated the transverse member 2 and the movable member 6 are both made of plastics material and are joined by an integral hinge.

Although the transverse member and movable member 6 are shown as being of L-section they may be of arcuate section, so long as the rear surface of transverse member 2 lies at an appropriate oblique angle to the handle 1. If desired the "foot" 23 of movable member 6 may be omitted.

In a modification of the illustrated implement the forward end of handle 1 is formed with a male thread and socket portion 3 is formed with a corresponding female thread, the nails 4 or the like being omitted and the handle 1 being screw threadedly engaged in the socket portion 3.

In another modification transverse member 2 comprises a broom head as indicated at 24 in FIG. 2. Such an implement can be used, for example, by road sweepers, park keepers or the like. In this case any objects lying on the ground, e.g. stones, discarded beer cans or the like, can be lifted using such a modified implement. Conventionally a road sweeper uses a brush or broom and, when a suitable pile has been gathered, uses a shovel or the like to transfer the pile to his barrow or cart.

In a still further modification of the invention an electric motor is mounted on the sahft and is arranged to move sleeve 19 or a similar movable member longitudinally of the handle 1. For example such a motor, e.g. an electric motor which may be battery or mains driven or a clockwork motor may have a drive worm the axis of rotation of which is arranged longitudinally of the handle 1, which worm engages with a rack attached to sleeve 19.

As can be seen from FIG. 1, movable member 6 has a cut-out portion 25 to allow pivoting of movable member 6.

What is claimed is:

1. An implement for gathering objects lying on the ground comprising an elongated handle having an upper end and a lower end, a collar slidably mounted about the handle adjacent the upper end thereof, a first L-shaped member mounted on the lower end of the handle, one leg of which first L-shaped member is angled downwardly and forwardly of the handle, a second L-shaped member mounted adjacent the lower end of the handle for movement between an inactive position with one leg thereof aligned axially of the handle and the other leg extends normally to the axis of the handle and an active position in which the two L-shaped members form an enclosure defined by the four legs of the two L-shaped members and cooperate to gather objects lying on the ground, an elongated link member pivotally connected at its upper end to the aforementioned collar and pivotally connected at its lower end to the rear of the second L-shaped member adjacent the angle between the legs thereof, movement of the collar downwardly towards the lower end of the handle angling the lower end of the link outwardly of the handle and rotating the second L-shaped member downwardly and outwardly of the handle and over thereby to define the objects-retaining enclosure for objects scooped from the ground by the lower leg of the first L-shaped member.

2. An implement according to claim 1 having spring means biasing the movable member towards the inactive position.

3. An implement according to claim 2 in which the spring means comprises a coiled member mounted about the pivot axis of the link member on the handle the end portions of the coiled member bearing respectively against the second L-shaped member and the aforementioned one leg of the first L-shaped member.

4. An implement is in claim 1, including a motor mounted on the handle in operative relation to the collar, activation of said motor initially moving the collar downwardly of the handle.

5. An implement according to claim 4, in which the motor comprises an electric motor.

6. An implement as in claim 5, in which the first L-shaped member is socketed to receive and engage the forward end of the handle.

7. An implement for gathering objects lying on the ground comprising an elongated handle having an upper end and a lower end, a collar slidably mounted about the handle adjacent the upper end thereof, a first scoop member mounted on the lower end of the handle, one portion of which first scoop member is angled downwardly and forwardly of the handle, a second scoop member mounted adjacent the lower end of the handle for movement between an inactive position with one portion thereof aligned axially of the handle and the other portion of which extends normally to the axis of the handle and an active position in which the two scoop members cooperate to gather objects lying on the ground, and form an enclosure retaining same, and an elongated link member pivotally connected at its upper end to the aforementioned collar and pivotally connected at its lower end to the rear of the second scoop member, movement of the collar downwardly towards the lower end of the handle angling the lower end of the link outwardly of the handle and rotating the second scoop member downwardly and outwardly of the handle and over thereby to define the objects-retaining enclosure for objects scooped from the ground by the first scoop.

* * * * *